United States Patent [19]

Yamaguti et al.

[11] 4,053,932
[45] Oct. 11, 1977

[54] GHOST SIGNAL ELIMINATING SYSTEM

[75] Inventors: Namio Yamaguti; Minoru Miyata; Keisuke Yamamoto, all of Ibaragi, Japan

[73] Assignee: Matsushita Electric Industrial Co., Ltd., Osaka, Japan

[21] Appl. No.: 636,720

[22] Filed: Dec. 1, 1975

[30] Foreign Application Priority Data

| June 10, 1974 | Japan | 49-65738 |
|---|---|---|
| June 10, 1974 | Japan | 49-65739 |
| June 10, 1974 | Japan | 49-65740 |

[51] Int. Cl.² .......................... H04N 5/21; H04B 1/12
[52] U.S. Cl. .................................. 358/167; 358/905; 328/165; 325/476
[58] Field of Search .................... 178/DIG. 44, 7.3 R, 178/69.5 TV, 69.5 DC, 69.5 CB, 6.6 TC; 333/29, 30 R; 307/208, 221 D; 310/9.8; 358/8, 167, 90 S, 149; 360/36; 357/24; 328/165; 325/475, 476

[56] References Cited

U.S. PATENT DOCUMENTS

| 3,238,300 | 3/1966 | Bopp et al. | 178/69.5 TV |
|---|---|---|---|
| 3,482,168 | 12/1969 | Sasao | 178/DIG. 44 |
| 3,749,823 | 7/1973 | Warner | 358/81 |
| 3,758,710 | 9/1973 | Crosno | 178/69.5 DC |
| 3,763,317 | 10/1973 | Coleman et al. | 358/8 |
| 3,935,536 | 1/1976 | Kimura et al. | 178/DIG. 44 |
| 3,956,585 | 5/1976 | Butler et al. | 358/167 |
| 4,013,834 | 5/1977 | Kind et al. | 358/167 |

OTHER PUBLICATIONS

Coleman, "A New Technique for Time Base Stabilization of Video Recorders," IEEE Transactions on Broadcasting, vol. BC-17, No. 1 (Mar. 1971), pp. 29-36.

*Primary Examiner*—John C. Martin
*Attorney, Agent, or Firm*—Stevens, Davis, Miller & Mosher

[57] ABSTRACT

A ghost signal eliminating system which eliminates a ghost by delaying a video signal through a variable delay line by the delay time of the ghost from the true image and subtracting the delayed video signal from the original video signal. The variable delay line comprises a fine adjusting circuit for fine-adjusting the delay time and a coarse adjusting circuit for coarse-adjusting the delay time, the coarse adjusting circuit being controlled by a detection voltage for a control voltage level and the fine adjusting circuit being controlled by a voltage which is the difference between the control voltage and the detection voltage.

6 Claims, 10 Drawing Figures

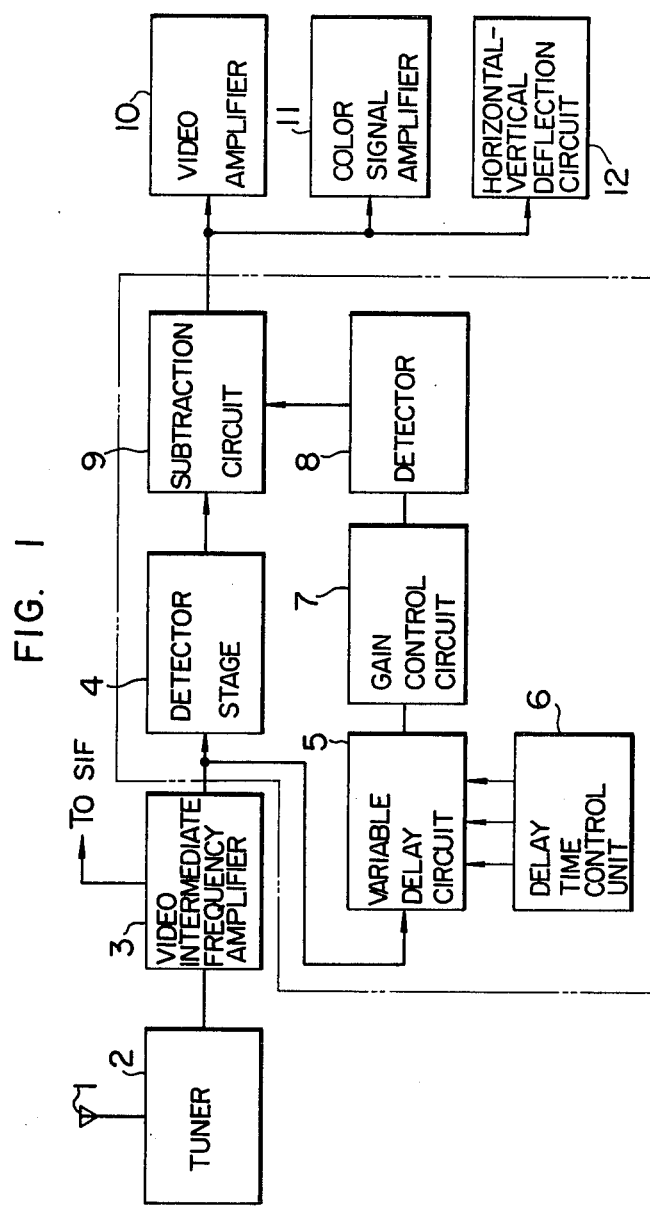

GHOST SIGNAL ELIMINATING SYSTEM

The present invention relates to a ghost signal eliminating system for eliminating ghost signals appearing on the picture image of a television receiver set.

In a television receiver set, ghosts are one of the causes of deterioration of the quality of the picture. Many approaches to prevent ghosting have been tried but none has proved satisfactory. For example, there has been proposed the approach of cancelling out a ghost by generating a signal having the same delay time and amplitude as those of the ghost through circuit means. However, this approach has not been fully put into practice because inexpensive and variable delay time delay line have not been available. Recently, as a delay element which satisfies the above requirement, a supersonic delay line which utilizes a surface wave and a charge transfer device such as BBD, CCD have been developed and an investigation to put them into practice is in progress.

It is, therefore, an object of the present invention to provide a ghost eliminating system having an additional delay time control means suitable for the delay time control of a variable delay circuit including a surface wave delay line or a charge transfer device.

The above and other objects, features and advantages of the present invention will become more apparent from the following detailed description of the preferred embodiments of the invention when taken in conjunction with the accompanying drawings, in which:

FIG. 1 is a block diagram of a major portion of a television receiver set equipped with a ghost eliminating system of the present invention.

FIG. 2 is a plan view of a part used in the televison receiver set of FIG. 1.

Figure 3:
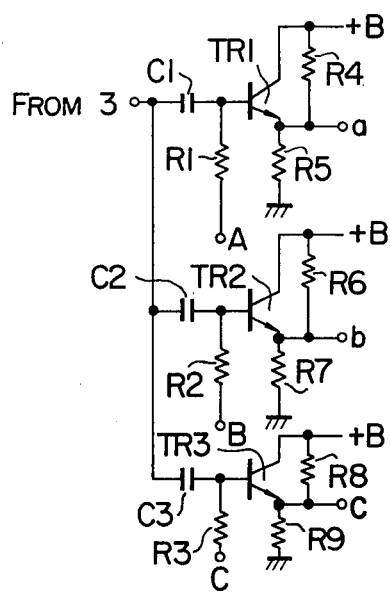
FIG. 3 shows an input circuit thereof.

The present invention will now be described in detail. Referring to FIG. 1, a system is shown in which a surface wave delay line is used in a variable delay circuit. In the drawing, an incoming electromagnetic wave including a ghost is received by an antenna 1, passes through a tuner 2 to a video intermediate frequency amplifier 3 where it is amplified, thence to a detector stage 4 on the one hand and to a variable delay circuit 5 on the other. The delay time of the variable delay circuit 5 is controlled by a delay time control unit 6. An output from the variable delay circuit 5 passes through a gain control circuit 7 and a detector 8 where it is converted to a ghost elimination signal, which is then applied to a subtraction circuit 9 in which the ghost signal is removed from the original signal and the resulting signal is distributed to a video amplifier 10, a color signal amplifier 11 and a horizontal-vertical deflection circuit 12. That portion of the drawing which is encircled by a dotted line is the ghost eliminating system.

Figure 4:
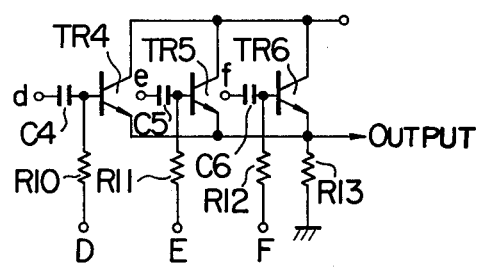
FIG. 4 shows an output circuit thereof.

Examples of a surface wave delay line used in the variable delay circuit 5 and input and output circuits thereof are shown in FIGS. 2, 3 and 4, respectively. The surface wave delay line of FIG. 2 comprises a surface wave delay line substrate 13 having a plurality of comb-like electrodes 14 arranged at the input and the output. The delay time of such a surface wave delay line is determined by the length of spacing between the input electrode and the output electrode. Therefore, by applying an input signal selectively to the input electrodes $a$, $b$ and $c$ arranged at a narrow pitch, fine control of the delay time is accomplished, and by switching the output electrodes $d$, $e$ and $f$ arranged at a large pitch, coarse control of the delay time is attained. For example, when ten input electrodes are arranged at a pitch corresponding to 0.1 $\mu$ sec. and ten output electrodes are arranged at a pitch corresponding to 1 $\mu$ sec., the delay time can be adjusted in the range of 0.1 - 10 $\mu$ sec. in 0.1 $\mu$ sec. steps by appropriately switching both input and output electrodes. In switching the input signal an input circuit as shown in FIG. 3 may be used. A signal from the intermediate frequency amplifier 3 passes through capacitors $C_1$, $C_2$ and $C_3$ in FIG. 3 to the bases of transistors $TR_1$, $TR_2$ and $TR_3$. If, for example, a positive voltage is applied to a terminal B only and terminals A and C are grounded, only the transistor $TR_2$ conducts producing an output only at an electrode $b$. FIG. 4 shows an output circuit for switching the output signal in which signals at electrodes $d$, $e$ and $f$ having different delay time from each other are applied to bases of transistors $TR_4$, $TR_5$ and $TR_6$. An output may be taken by selectively rendering one of the transistors conductive by selective application of terminal voltages at terminals D, E and F. The electrodes $a$, $b$, $c$, $d$, $e$ and $f$ in FIGS. 3 and 4 correspond to the electrodes $a$, $b$, $c$, $d$, $e$ and $f$ in FIG. 2, respectively. In order to sequentially change the delay time of the surface wave delay line of FIG. 2, it is necessary to apply voltages at the terminals in FIGS. 3 and 4 in the sequence shown in the table below.

Table I

| Delay Time | Increase → | | | | | | | |
|---|---|---|---|---|---|---|---|---|
| Positive Potential Input Terminals | A | B | C | A | B | C | A | B | C |
| Positive Potential Output Terminal | D | D | D | E | E | E | F | F | F |

Figure 5:
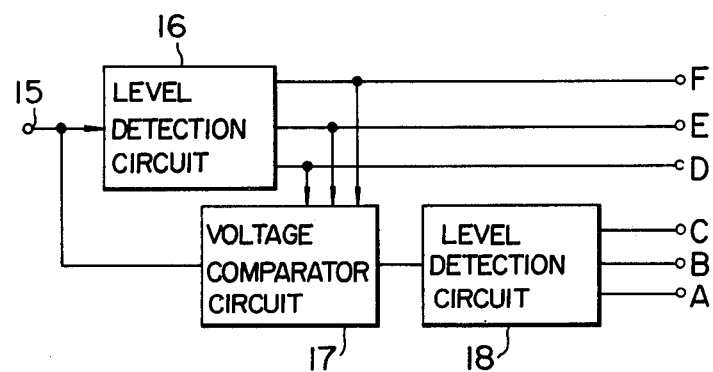
FIG. 5 is a specific block diagram of a major portion of the receiver set in FIG. 1.

The delay time control unit 6 in FIG. 1 is provided to enable the application of the voltages in the above sequence. FIG. 5 shows a detailed block diagram thereof. A continuously varying control voltage is applied to a control voltage terminal 15 in FIG. 5. Such a control voltage may be produced through a variable resistor, for example. A level detection circuit 16 produces an output of a predetermined voltage at terminal D, E or F depending on the level of the control voltage. A voltage comparator circuit 17 converts the output of the predetermined voltage at the terminal D, E or F to an incremental level voltage or step voltage and subtracts the step voltage from the control voltage. A level detection circuit 18 produces an output of a predetermined voltage at terminal A, B or C depending on the level of an output voltage from the voltage comparator circuit 17. (The terminals A - F in FIG. 5 correspond to those in FIGS. 3 and 4.) The above operation can be represented by the following table.

Table II

| Control Voltage (in volts) | 0 | 1 | 2 | 3 | 4 | 5 | 6 | 7 | 8 |
|---|---|---|---|---|---|---|---|---|---|
| Voltage Applied Terminal | D | D | D | E | E | E | F | F | F |
| Voltage Applied Terminal | A | B | C | A | B | C | A | B | C |

As the control voltage continuously changes from 0 volt to 9 volts, the output of the predetermined voltage appears at the terminals D and A when the control voltage is equal to or higher than 0 volt and lower than 1 volt, at the terminals D and B when equal to or higher than 1 volt and lower than 2 volts, at the terminals D and C when equal to or higher than 2 volts and lower than 3 volts, . . . . . . , at the terminals F and C when equal to or higher than 8 volts and lower than 9 volts. In this manner, by adjusting the control voltage at the control terminal 15 of the delay time control unit of FIG. 5, the switching of the input circuit of FIG. 3 and the output circuit of FIG. 4 can be controlled so as to control the delay time of the surface wave delay line of FIG. 2. It should be understood that the input terminals a, b and c of the variable delay line 13 may be arranged at a pitch corresponding to a coarse delay time increment and the output terminals d, e and f may be arranged at a pitch corresponding to a fine delay time increment.

Figure 6:
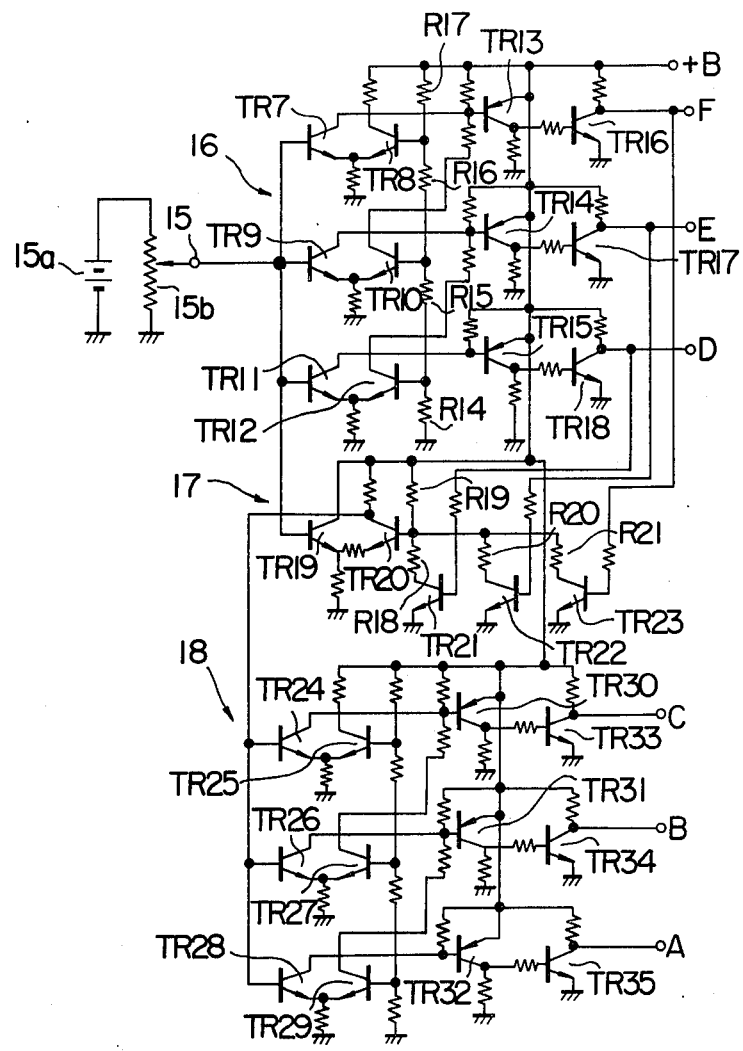
FIG. 6 shows a specific circuit diagram of the circuit of FIG. 5.

FIG. 6 shows a specific circuit of the block diagram of FIG. 5. In FIG. 6, transistors $TR_7 - TR_{18}$ constitute the level detection circuit 16, transistors $TR_{19} - TR_{23}$ constitute the voltage comparator circuit 17 and transistors $TR_{24} - TR_{35}$ constitute the level detection circuit 18. A voltage from a D.C. supply 15a modified by a variable resistor 15b is applied to the terminal 15, which is connected to the bases of the transistors $TR_7$, $TR_9$, $TR_{11}$ and $TR_{19}$, the emitters of which are directly connected to the emitters of the transistors $TR_8$, $TR_{10}$, $TR_{12}$ and $TR_{20}$, respectively and the junctions thereof are grounded through resistors, respectively. The collectors of the transistors $TR_7$, $TR_9$ and $TR_{11}$ are connected to the bases of the succeeding stage transistors $TR_{13}$, $TR_{24}$ and $TR_{15}$, respectively. The collector of the transistor $TR_8$ is connected through a resistor to a +B supply terminal, the collector of the transistor $TR_{10}$ is connected through a resistor to the base of the transistor $TR_{13}$, and the collector of the transistor $TR_{12}$ is connected through a resistor to the base of the transistor $TR_{14}$. Connected between the +B supply and the ground is a series circuit of resistors $R_{17}$, $R_{16}$, $R_{15}$ and $R_{14}$, the junction of the resistors $R_{17}$ and $R_{16}$ being connected to the base of the transistor $TR_8$, the junction of the resistors $R_{16}$ and $R_{15}$ being connected to the base of the transistor $TR_{10}$ and the junction of the resistors $R_{15}$ and $R_{14}$ being connected to the base of the transistor $TR_{12}$. The base voltage at the transistor $TR_8$ is 14 while the base voltage at the transistor $TR_{12}$ is lowest. The +B supply voltage is applied to the bases of the transisitors $TR_{13}$, $TR_{14}$ and $TR_{15}$ through resistors. The emitters of these transistors are connected to the +B supply terminal and the collectors thereof are grounded through resistors and also connected to the bases of the succeeding stage transistors $TR_{16}$, $TR_{17}$ and $TR_{18}$, respectively, through resistors. Output terminals F, E and D are coupled to the transistors $TR_{16}$, $TR_{17}$ and $TR_{18}$, respectively and they are also connected to the bases of the transistors $TR_{21}$, $TR_{22}$ and $TR_{23}$, respectively, through resistors. The collectors of the transistors $TR_{21}$, $TR_{22}$ and $TR_{23}$ are connected to the base of the transistor $TR_{20}$ through resistors $R_{18}$, $R_{20}$ and $R_{21}$, respectively, of which the resistor $R_{18}$ is of lowest value while the resistor $R_{21}$ is of highest value. The circuit parameters are designed such that the base voltage of the transistor $TR_{20}$ when only the transistor $TR_{21}$ is on is equal to the base voltage of the transistor $TR_{12}$, the base voltage of the transistor $TR_{20}$ when only the transistor $TR_{22}$ is on equal to the base voltage of the transistor $TR_{10}$, and the base voltage of the transistor $TR_{20}$ when only the transistor $TR_{23}$ is on is equal to the base voltage of the transistor $TR_8$. The collector voltage of the transistor $TR_{20}$ is coupled to the bases of the transistors $TR_{24}$, $TR_{26}$ and $TR_{28}$. The circuit following to the transistors $TR_{24}$, $TR_{26}$ and $TR_{28}$ are exactly same as that of the transistors $TR_7 - TR_{18}$ and hence the explanation thereof is omitted here. Output terminals C, B and A are coupled to the collectors of the transistors $TR_{33}$, $TR_{34}$ and $TR_{35}$, respectively.

The operation of the above circuit is now described.

When the control voltage applied to the control voltage terminal 15 is zero volt, the transistors $TR_7$, $TR_9$, and $TR_{11}$ are turned off and the transistors $TR_8$, $TR_{10}$ and $TR_{12}$ are turned on. Thus, the base potential of the transistor $TR_{15}$ is at a high level so that the transistor $TR_{15}$ is turned off and the transistors $TR_{13}$ and $TR_{14}$ are turned on because the base potentials thereof are at a low level. As a result, the transistor $TR_8$ is turned off, the transistors $TR_{16}$ and $TR_{17}$ are turned on resulting in a high level only at the terminal D. When the control voltage exceeds the voltage at the junction of the resistors $R_{14}$ and $R_{15}$, the transistor $TR_{11}$ is turned on and the transistor $TR_{12}$ is turned off so that the transistors $TR_{15}$ and $TR_{18}$ are turned on and the transistors $TR_{14}$ and $TR_{17}$ are turned off resulting in a high level only at the terminal E. In this manner, as the control voltage rises, the terminals D, E and F are sequentially switched to the high level. The voltages at the terminals D, E and F are applied to the bases of the transistors $TR_{21}$, $TR_{22}$ and $TR_{23}$, respectively and the base voltage of the transistor $TR_{20}$ is sequentially switched. By properly selecting the values of the resistors $R_{18} - R_{21}$, the base voltage of the transistor $TR_{20}$ can be rendered equal to the voltage divided by the resistors $R_{14} - R_{17}$, as described above. Since the transistors $TR_{19}$ and $TR_{20}$ constitute a differential amplifier the collector voltage of the transistor $TR_{20}$ is proportional to the control voltage less the base voltage of the transistor $TR_{20}$. That is, the collector voltage of the transistor $TR_{20}$ resets to its original value each time the transistors $TR_{21} - TR_{23}$ are switched on or off depending on the voltages at the terminals D, E and F. This voltage is again dectected by the level detection circuit 18 ($TR_{24} - TR_{35}$), the operation of which is identical to that of the level detection circuit 16 and hence it is not repeated here. Consequently, the terminals A, B and C are switched to the high level sequentially with the increase of the voltage of the transistor $TR_{20}$.

Figure 7:
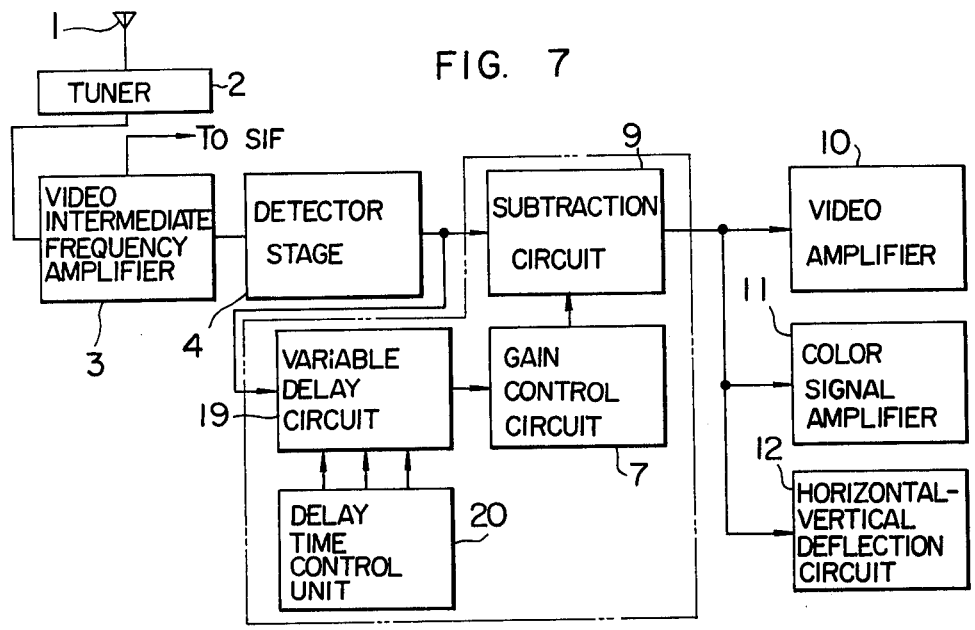
FIG. 7 is a block diagram of a television receiver set which uses a ghost eliminating system in accordance with another embodiment of the present invention.
Figure 8:
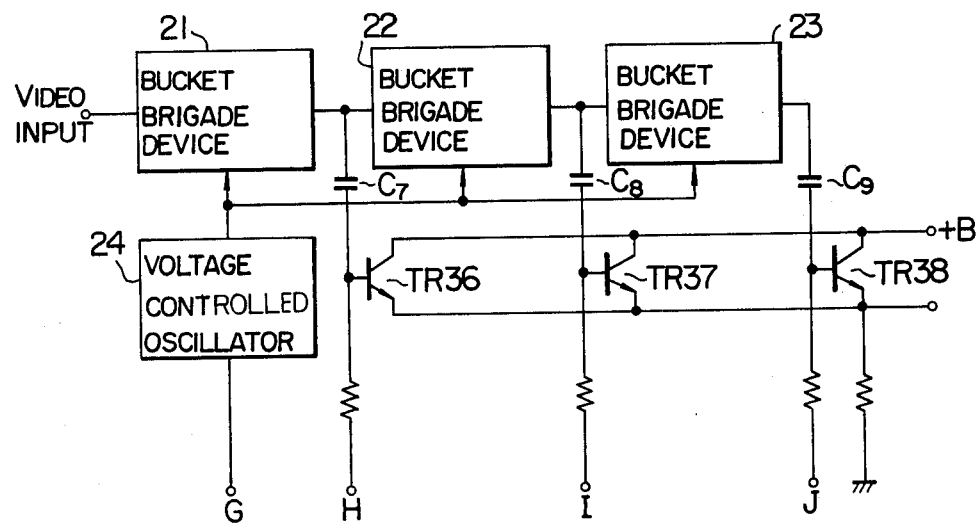
FIG. 8 is a circuit diagram of a portion of the receiver set of FIG. 7.
Figure 9:
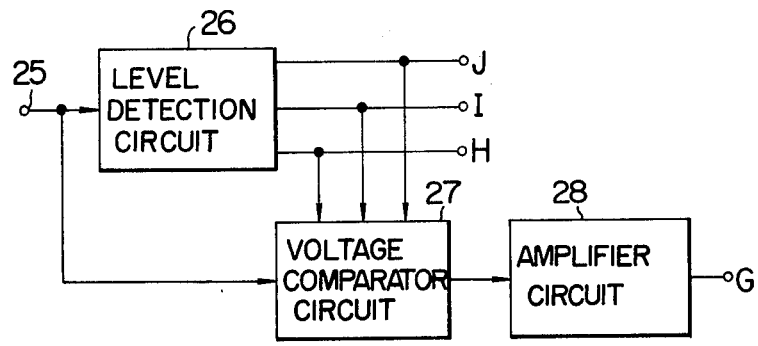
FIG. 9 is a specific block diagram of the receiver set of FIG. 7.
Figure 10:
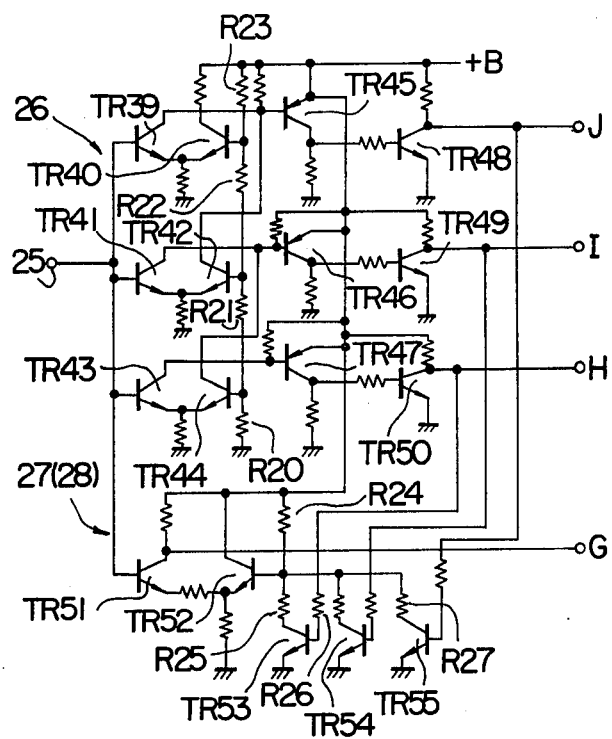
FIG. 10 is a specific circuit diagram of FIG. 9.

Next, FIG. 7 shows a block diagram of a major portion of a television receiver set with a ghost eliminating system using another embodiment of the delay time control circuit of the present invention, in which BBD's are used in the variable delay circuit. In the drawing, 19 designates the variable delay circuit, 20 designates the delay time control circuit, and the circuit arrangement is similar to FIG. 1 except that a detected signal is applied to the ghost eliminating system. The variable delay circuit 19 is constructed as shown in FIG. 8, in which 21, 22 and 23 designate charge transfer devices comprising BBD's (bucket brigade devices) and 24 designates a voltage controlled oscillator. The charges of the BBD's 21 - 23 are transferred by clock signals from the voltage controlled oscillator 24, the transfer time being changed by changing the frequency of the clock. CCD's (charge coupled devices) may also be used to construct the charge transfer circuit. When two-phase driven BBD's with N stages are used, there exists a relation of $\tau = N/2f_c$ where $f_c$ is a clock frequency and $\tau$ is a delay time. Although the delay time $\tau$ may be changed significantly if the clock frequency $f_c$ can be changed considerably, a sampling beat appears on the picture if $f_c$ is low thereby deteriorating the quality of the picture, and the BBD's 21 - 23 will not work when $f_c$ is high. In a color television receiver set, when bipolar BBD's are used $f_c$ can only be changed in the range of 10 - 20 MHz. For this reason, it is necessary to change the clock frequency $f_c$ and at the same time change the number of stages of the BBD's 21 - 23 in order to vary the delay time $\tau$. The adjustment of the clock frequency $f_c$ may be carried out by the voltage applied to the terminal G while the switching of the number of stages of the BBD's 21 - 23 may be carried out by selectively applying a D.C. voltage to the terminals H, I and J to selectively bias the transistors $TR_{36} - TR_{38}$. FIG. 9 shows a detailed block diagram of the delay time control unit 20 (FIG. 7) therefor. While the number of stages is switched at the output of the BBD's in FIG. 8, it may be also switched at the input. A continuously varying control voltage is applied to a control voltage terminal 25 in FIG. 9. Such a control voltage may be generated through a variable resistor. A level detection circuit 26 produces an output of a given voltage at terminal H, I or J depending on a level of the control voltage at the control voltage terminal 25. A voltage comparator circuit 27 converts the output of the given voltage at the terminal H, I or J to an incremental level voltage or step voltage and subtracts the step voltage from the control voltage. The resulting voltage is amplified by an amplifier 28 which produces an output at a terminal G. (The terminals G - J in FIG. 9 correspond to those in FIG. 8.) For example, let us assume that the control voltage is continuously changed from 0 volt to 9 volts. An output of a given voltage is produced at the terminal H when the control voltage is equal to or higher than 0 volt and lower than 3 volts, at the terminal I when equal to or higher than 3 volts and lower than 6 volts, and at the terminal J wnen equal to or higher than 6 volts and lower than 9 volts. In each of the three sections, the voltage at the terminal G repeatedly changes from the first level to the second level in a continuous mode. In this manner, by controlling the control voltage at the control voltage terminal 25 of the delay time control unit in FIG. 9, the clock frequency of the variable delay circuit of FIG. 8 and the number of BBD stages thereof can be controlled. In this case, by the adjustment of the number of BBD stages, stepwise coarse adjustment of the delay time is carried out, and by the adjustment of the clock frequency, continuous fine adjustment of the delay time is carried out, FIG. 10 shows a particular circuit arrangement for FIG. 9. In the drawing, transistors $TR_{39} - TR_{50}$ constitute the level detection circuit 26, and transistors $TR_{51} - TR_{55}$ constitute the voltage comparator circuit 27 and the amplifier circuit 28. Since the particular construction is same as that of the circuit of $TR_{15} - TR_{23}$ in FIG. 6, the explanation thereof is omitted here. When the control voltage applied to the control voltage terminal 25 is 0 volt, the transistors $TR_{39}$, $TR_{41}$, $TR_{43}$ are turned off and transistors $TR_{40}$, $TR_{42}$, $TR_{44}$ are turned on so that the transistor $TR_{47}$ is turned off and the transistors $TR_{45}$, $TR_{46}$ are turned on resulting in a high level only at the terminal H. When the control voltage exceeds the voltage at the junction of the resistors $R_{20}$ and $R_{21}$, the transistor $TR_{43}$ is turned on and the transistor $TR_{44}$ is turned off resulting in the high level only at the terminal I. In this manner, as the control voltage rises, the terminals H, I and J are sequentially switched to the high level. The voltages at the terminals H, I and J are applied to the bases of the transistors $TR_{53}$, $TR_{54}$ and $TR_{55}$, respectively and the base voltage of the transistor $TR_{52}$ is sequentially switched. By proper selection of the magnitudes of the resistors $R_{24} - R_{27}$, the base voltage of the transistor $TR_{52}$ can be rendered equal to the voltage divided by the resistors $R_{20} - R_{23}$. Since the transistors $TR_{51}$ and $TR_{52}$ constitute a differential amplifier, the collector voltage of the transistor $TR_{51}$ is proportional to the control voltage less the base voltage of the transistor $TR_{52}$. That is, the collector voltage of the transistor $TR_{51}$ resets to its original voltage value each time the transistors $TR_{53} - TR_{52}$ are switched on or off depending on the voltages at the terminals H, I and J.

In this way, according to the present invention, it is possible to control the delay time of the varible delay circuit which uses the surface wave delay line or charge transfer devices over a wide range in fine stepwise manner or continuously, and the present invention is most suitable for the delay time control of such variable delay circuit. Further, the arrangement of the present invention can be readily constructed in IC structure with low cost. Moreover, as shown in FIG. 6, the delay time may be changed by a single variable resistor. If the delay time of the ghost from the true image can be automatically detected and the detected voltage is applied to the terminal 15, the manual adjustment may be eliminated.

What is claimed is:

1. A ghost signal eliminating system comprising:
   a surface wave delay circuit for delaying a video signal by a delay time of a ghost signal with respect to a true image, said surface wave delay circuit having a plurality of coarse adjustment terminals for coarsely adjusting the delay time and a plurality of fine adjustment terminals for finely adjusting the delay time;
   a subtraction circuit for subtracting the video signal delayed by said surface wave delay circuit from the original video signal;
   a fine adjustment switching circuit for switching said plurality of fine adjustment terminals of said surface wave delay circuit;
   a coarse adjustment switching circuit for switching said plurality of coarse adjustment terminals of said surface wave delay circuit;
   a first level detection means for producing a fixed voltage at a corresponding one of a plurality of output terminals thereof depending on the level of a varying control voltage applied thereto;
   a voltage comparator means for subtracting said fixed voltage developed at the corresponding one of the output terminals of said first level detection means from said varying control voltage;
   a second level detection means for producing a fixed voltage at a corresponding one of a plurality of output terminals thereof depending on the level of the output voltage from said voltage comparator means;

a means for applying the fixed voltage developed at the output terminals of said first level detection means to a plurality of control terminals of said coarse adjustment switching circuit; and a further means for applying the fixed voltage developed at the output terminals of said second level detection means to a plurality of control terminals of said fine adjustment switching circuit.

2. A ghost signal eliminating system according to claim 1 wherein said varying control voltage is generated by a D.C. voltage source having a variable resistor connected thereto for manual adjustment by a viewer.

3. A ghost signal eliminating system according to claim 1 wherein said voltage comparator means comprises a plurality of switching elements to which the plurality of output terminals of said level detection means are connected, a plurality of voltage divider circuits for dividing a D.C. voltage connected in series to said switching elements the divided voltages of the plurality of voltage divider circuits being different from each other, voltage dividing points thereof being coupled to one input terminal of a differential amplifier and said varying control voltage being applied to the other input terminal of said differential amplifier.

4. A ghost signal eliminating system comprising:
a charge transfer circuit for delaying a video signal by a delay time of a ghost signal with respect to a true image;
a subtraction circuit for subtracting the video signal delayed by said charge transfer circuit from the original video signal;
a switching circuit for effecting a coarse adjustment of the delay time by switching the charge transfer stages of said charge transfer circuit;
a voltage controlled oscillator for effecting a fine adjustment of the delay time by changing the frequency of a clock signal which is produced by said voltage controlled oscillator and is applied to said charge transfer circuit;
a level detection means for producing a fixed voltage at a corresponding one of a plurality of output terminals thereof depending on the level of a varying control voltage applied thereto;
a voltage comparator means for subtracting said fixed voltage developed at the plurality of output terminals of said level detection means from said varying control voltage;
a means for applying the fixed voltage developed at the plurality of output terminals of said level detection means to a plurality of control terminals of said switching circuit; and
a further means for applying the output voltage of said voltage comparator means to said voltage controlled oscillator to vary the frequency of the clock signal produced by said voltage controlled oscillator.

5. A ghost signal eliminating system according to claim 4 wherein said varying control voltage is generated by a D.C. voltage source having a variable resistor connected thereto for manual adjustment by a viewer.

6. A ghost signal eliminating system according to claim 4 wherein said voltage comparator means comprises a plurality of switching elements to which the plurality of output terminals of said level detection means are connected, a plurality of voltage divider circuits for dividing a D.C. voltage connected in series to said switching elements the divided voltages of the plurality of voltage divider circuits being different from each other, voltage dividing points thereof being coupled to one input terminal of a differential amplifier and said varying control voltage being applied to the other input terminal of said differential amplifier.

* * * * *